United States Patent [19]

Worrallo

[11] 4,308,963
[45] Jan. 5, 1982

[54] SHELVES

[76] Inventor: Anthony C. Worrallo, 15, Sprott Rd., Kohimarama, Auckland 5, New Zealand

[21] Appl. No.: 104,020

[22] Filed: Dec. 17, 1979

[51] Int. Cl.³ ............................................. B32B 23/02
[52] U.S. Cl. ..................................... 211/153; 428/192; 428/76; 248/558
[58] Field of Search .................. 52/811, 518, 540, 560; 312/351; 211/153, 150; 428/68, 76, 192; 182/1; 248/558; 108/13

[56] References Cited

U.S. PATENT DOCUMENTS

| 1,418,348 | 6/1922 | Young | 428/76 |
| 1,638,280 | 8/1927 | Utzman | 428/192 |
| 2,678,891 | 5/1954 | Jenkins | 428/68 |
| 3,389,033 | 6/1968 | Ullman . | |
| 3,415,708 | 12/1968 | Rondum | 428/76 |

FOREIGN PATENT DOCUMENTS

| 891950 | 2/1972 | Canada . | |
| 244094 | 3/1912 | Fed. Rep. of Germany | 52/183 |
| 94624 | 7/1959 | Norway | 52/183 |
| 1272846 | 5/1972 | United Kingdom | 428/68 |

Primary Examiner—Price C. Faw, Jr.
Assistant Examiner—Henry E. Raduazo
Attorney, Agent, or Firm—Roylance, Abrams, Berdo & Farley

[57] ABSTRACT

An elongated planar reversible shelf on which the opposite edges are curved so that one edge merges smoothly with one major face and intersects the other face at an angle of 90°, and the other edge merges smoothly into the other major face and forms a 90° angle with the one. The faces and, if desired, the ends are covered with a wood or plastic veneer or laminate.

3 Claims, 1 Drawing Figure

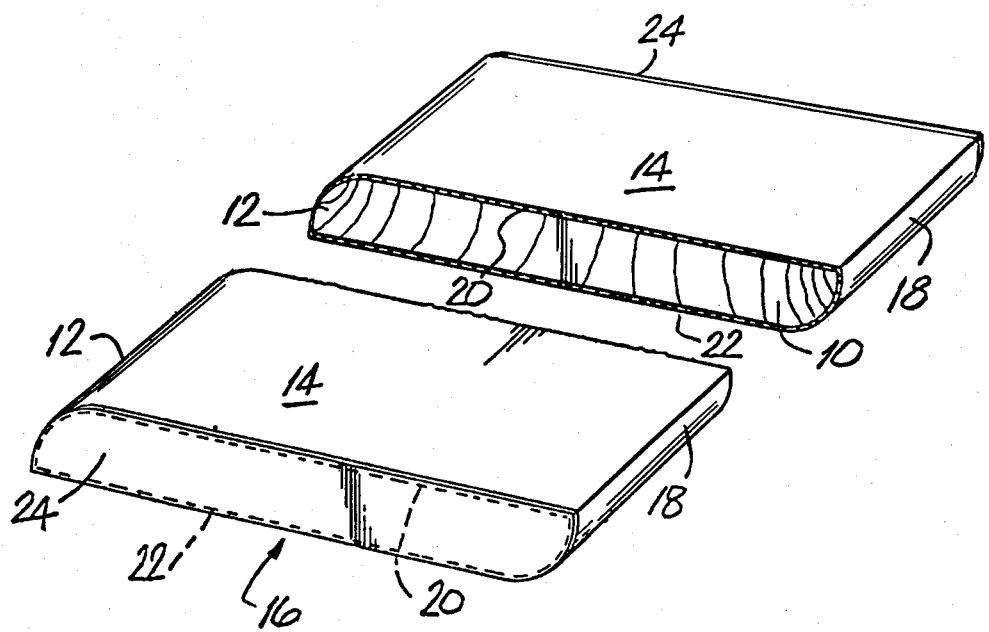

SHELVES

According to the present invention there is provided a shelf having upper and lower major faces, one longitudinally extending edge of the shelf being radiussed in each manner that it merges smoothly with said upper major face and intersects said lower major face, and the other longitudinally extending edge of the shelf being radiussed in such manner that it merges smoothly with said lower major face and intersects said upper major face, the finish of said upper major face and said one edge being different from the finish of the lower major face and said other edge.

In the preferred form, the shelf comprises a wooden core and two veneers adhered to the core, each veneer covering a respective major face and a respective longitudinally extending edge, and each extending from the line of intersection between the upper major face and the other edge to the line of intersection between said one edge and the lower major face, the veneers adjoining one another along said lines of intersection.

The shelf preferably also includes pieces of veneer covering the transverse ends of said core.

For a better understanding of the present invention, and to show how the same may be carried into effect, reference will now be made to the accompanying drawing in which the single FIGURE is a fragmentary perspective view, partially in section, of a shelf in accordance with the present invention.

The shelf illustrated comprises a wooden core 10, the wood of the core 10 being of sufficient strength for its intended purpose but not necessarily being of pleasing appearance. Thus relatively cheap but strong wood can be used. The core is covered with veneer which can be a natural wood veneer or a simulated veneer of synthetic polymeric material, i.e., plastic, as will be described in more detail hereinafter.

One longitudinally extending edge 12 of the shelf is formed with a smooth curve having a radius, about a longitudinal line, such that it merges smoothly with the upper major face 14 of the shelf and intersects, at right angles, the lower major face 16. To achieve this, the curve of the edge 12 extends through a 90 degree arc.

The other longitudinally extending edge 18 of the shelf is similarly radiussed, the radiussing of this shelf being such as to cause it to merge smoothly with the lower major face 16 and intersect, at a right angle, the upper major face 14.

The major face 14 and the edge 12 which merges therewith are covered by a veneer 20. This veneer extends from the line of intersection of the face 14 and the edge 18 to the line of intersection between the face 16 and the other edge 12. A veneer 22 covers the lower major face 16 and the edge 18, the longitudinally extending edges of the veneers 20 and 22 abutting.

The veneers 20 and 22 can be wood veneers or can be simulated veneers of synthetic plastic material. The choice will depend on the section of the market being aimed at, which in turn decides what the cost of the shelf can be.

The veneers 20 and 22 are different to one another so that the shelf has two distinct finishes. For example, a "Walnut" veneer (reddish brown) and a "Mahogany" veneer (darker brown) can be used together.

The transverse end faces of the shelf are covered by pieces of veneer 24. These pieces are chosen to simulate the end grain of a good quality piece of wood. Alternatively, these ends can be stained.

The veneers 20, 22 and 24 are adhered to the core 10 by means of a suitable adhesive.

It will be understood that by turning the shelf over the selected face 14 or 16 can be brought uppermost. Similarly, by turning the shelf around, the requisite edge 12 or 18 can be brought into use as the front edge.

What is claimed is:

1. A shelf having upper and lower major faces, one longitudinally extending edge of the shelf being formed with a smooth curve having a radius about a longitudinal line through the shelf such that it merges smoothly with said upper major face and intersects said lower major face, and the other longitudinally extending edge of the shelf being formed with a smooth curve having a radius about a longitudinal line through the shelf such that it merges smoothly with said lower major face and intersects said upper major face, the finish of said upper major face and said one edge being different from the finish of the lower major face and said other edge.

2. A shelf according to claim 1 and further comprising a wooden core and two veneers adhered to said opposite major faces of the core, each veneer covering one major face and the one of said longitudinally extending edges merging with said face through said curve, each of said veneers extending from the line of intersection between the other major face and said other edge to the line of intersection between said one edge and the major face which it covers, the veneers adjoining one another along said lines of intersection.

3. A shelf according to claim 2, and including pieces of veneer covering the transverse ends of said core.

* * * * *